(No Model.)
C. C. BARKER & T. CRANEY.
LOG CRIB.
No. 313,294. Patented Mar. 3, 1885.
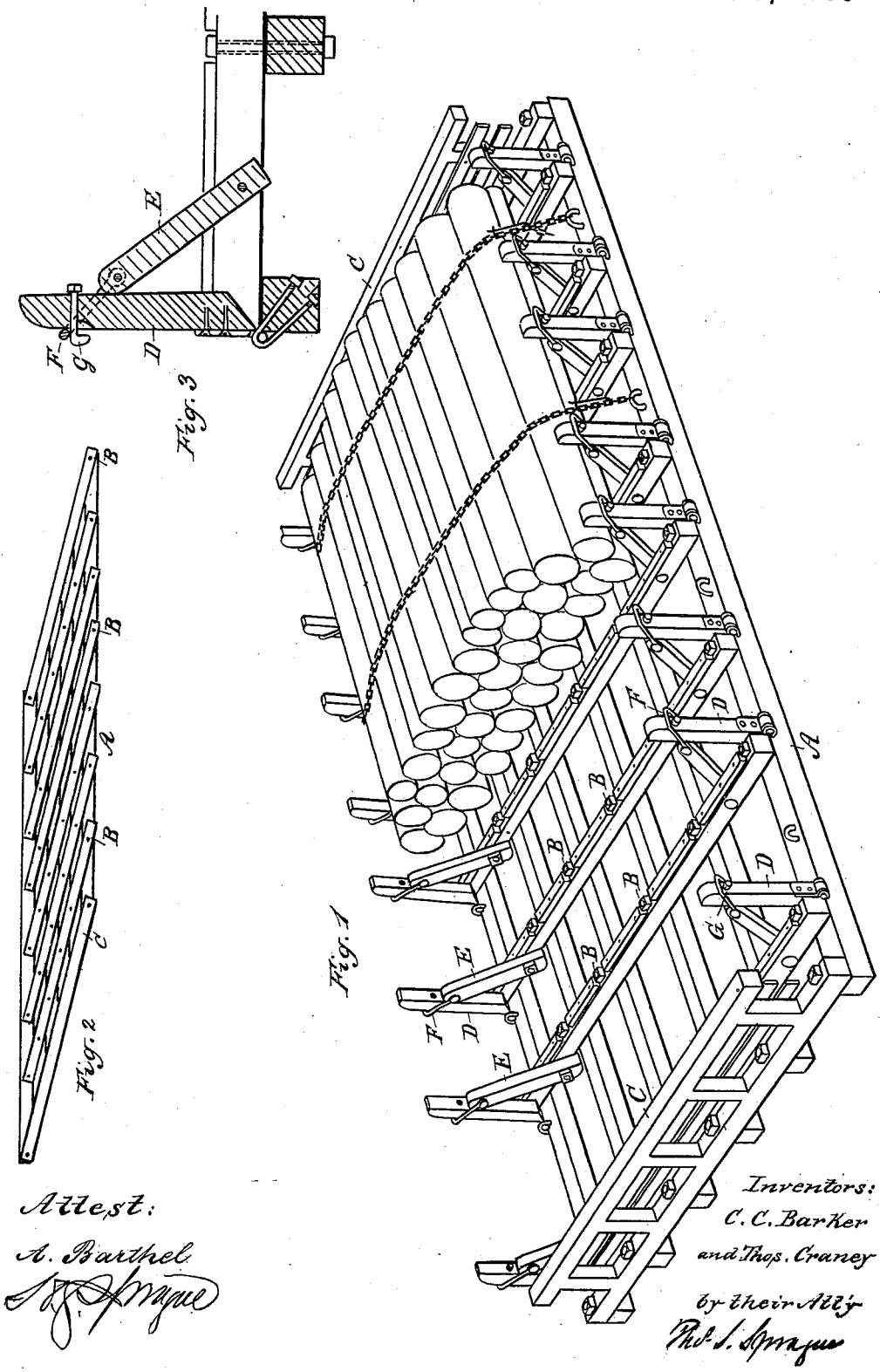
Inventors:
C. C. Barker
and Thos. Craney
by their Att'y
Thos. S. Sprague
Attest:
A. Barthel

UNITED STATES PATENT OFFICE.

COLUMBUS C. BARKER AND THOMAS CRANEY, OF BAY CITY, MICHIGAN.

LOG-CRIB.

SPECIFICATION forming part of Letters Patent No. 313,294, dated March 3, 1885.

Application filed December 10, 1884. (No model.)

*To all whom it may concern:*

Be it known that we, COLUMBUS C. BARKER and THOMAS CRANEY, of Bay City, in the county of Bay and State of Michigan, have invented new and useful Improvements in Log-Cribs; and we do hereby declare that the following is a full, clear, and exact description thereof, reference being had to the accompanying drawings, which form a part of this specification.

This invention relates to an improvement in raft-cribs, by means of which logs or timber may be transferred by water with greater economy, safety, and dispatch than is afforded by the present mode of transportation, wherein the logs are connected by means of so-called "rafting-chains" into a large raft and towed through the water by powerful tugs. This mode of transportation is neither economical nor safe and expeditious enough, and we propose by our present invention to improve upon said means. For this purpose we have invented a raft-crib which partakes of the nature of a permanent carrier, upon which the logs are loaded or banked, and may be towed with greater facility than is afforded by the raft.

The main feature of our improved raft-crib consists in its permanent nature, which is that of a carrier, and which distinguishes it from such floating timber-cribs heretofore used as a temporary means for floating and towing heavy masses across large bodies of water. This feature of a permanent carrier is given to our crib by making it folding or collapsing, so that after the logs are discharged from it at their port of destination the device, after collapsing, can be easily towed.

Another feature of our invention consists in the peculiar arrangement of stanchions in connection with the raft-crib, by means of which the logs are confined upon the crib, but which can be very easily turned down to facilitate the removal of the logs from the crib.

In the drawings which accompany this specification, Figure 1 is a perspective view of our improved raft-crib partly loaded with logs. Fig. 2 is a plan showing it collapsed. Fig. 3 is a detached cross-section of a stanchion.

A is a grillage float or crib, made of two layers of heavy timbers, preferably square. B B are bolts passing through the points of intersection, and thereby securing the top and bottom timbers together. These timbers are laid at regular distances apart, and the bolts which connect them together pass somewhat loosely through them, so that the whole float may be easily collapsed into the shape shown in Fig. 2, a shape which obliterates the open interstices between the timbers and puts the whole mass into such a compact form that it can be towed more readily.

C are bulwarks secured to the front and rear ends of the float, and D are stanchions secured along the two sides. These stanchions are hinged upon their lower ends to the float and are secured in their upright position by means of the inclined braces E, which are pivotally secured at their lower ends, and at their upper ends are provided with a swinging bail, F, which embraces the head of the stanchion and rests upon the projecting pin G. This pin G passes through the upper end of the stanchion and has a little end play therein. As long as the pin G is left projecting from the stanchion the latter is firmly braced in its upright position; but if the pin is driven back, the stanchion and its brace can be easily turned down together or separately in opposite directions after the bail is disengaged from the stanchion.

In practice, the logs are banked upon the crib in regular order by means of a floating log-elevator, which forms the subject of another application.

As it is the preferable way to bank the logs upon the crib lengthwise, the top timbers of the crib should run crosswise and be spaced near enough together to give the logs a firm support thereon.

In addition to the stanchions, a number of heavy binding-chains or other devices may be used to confine the logs upon the crib sufficiently well to withstand such heavy seas as are likely to be encountered by a lake-transport, for which the device is especially designed.

The collapsing of the crib in the manner shown in Fig. 2 is prevented by the logs themselves when the device is loaded.

If it should be found desirable to lessen the resistance of the device in towing, a pointed form or "cut-water" may be given to the bow.

To unload the logs, the binding-chains are removed and the stanchions turned down, which releases the logs and allows them to be floated off the crib.

We do not intend to confine ourselves to the exact construction of the parts herein shown, as we are well aware that the same may be easily altered without departing from the spirit of our invention, which consists in constructing a permanent carrier for logs in the shape of a strong grillage made of buoyant timbers secured together in such manner as to allow the device to be collapsed, and having bulwarks, removable stanchions, and binding-chains of suitable strength and number to confine the logs upon the float or crib against all contingencies of water transportation, and admit of easy removal of the logs at their point of destination.

What we claim as our invention is—

1. A raft-crib consisting of a collapsing grillage made of buoyant timber, the two layers of which are connected together at their points of intersections by bolts passing loosely through the timbers, and having suitable bulwarks, stanchions, or binding-chains constructed to confine the logs thereon in transportation, substantially as described.

2. In a raft-crib, a grillage made of buoyant timber, one lay of which runs lengthwise and the other sidewise, in combination with bulwarks secured to the end of the raft and removable stanchions secured to the sides of the raft, substantially as and for the purpose described.

3. In a raft-crib, the combination of the stanchion D, hinged to the frame thereof, inclined hinged brace E, swinging bail F, and loose pin G in the head of the stanchion, all combined and operating substantially as and for the purposes described.

COLUMBUS C. BARKER.
THOS. CRANEY.

Witnesses:
H. S. SPRAGUE,
CHARLES J. HUNT.